(12) United States Patent
Iustin

(10) Patent No.: US 12,434,514 B2
(45) Date of Patent: Oct. 7, 2025

(54) TIRE SENSOR PAIRING SYSTEM AND METHOD FOR PAIRING TIRE SENSORS

(71) Applicant: VOLVO TRUCK CORPORATION, Gothenburg (SE)

(72) Inventor: Roman Iustin, Mölnlycke (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 307 days.

(21) Appl. No.: 18/343,507

(22) Filed: Jun. 28, 2023

(65) Prior Publication Data

US 2024/0001720 A1 Jan. 4, 2024

(30) Foreign Application Priority Data

Jul. 4, 2022 (EP) ..................................... 22182827

(51) Int. Cl.
*B60C 23/04* (2006.01)
*G01M 17/02* (2006.01)

(52) U.S. Cl.
CPC ......... *B60C 23/0447* (2013.01); *G01M 17/02* (2013.01)

(58) Field of Classification Search
CPC .. G01M 17/02; G01M 17/022; G01M 17/027; G01M 17/021; G01M 17/024; G01M 17/025; G01M 17/013; G01M 17/007; G01M 1/045; G01M 17/06; G01M 1/326; G01M 1/02; G01M 1/30; G01M 17/0074; G01M 5/0058; G01M 1/26; G01M 17/04; G01M 1/225; G01M 17/065; G01M 17/0072; G01M 17/10; G01M 7/00; G01M 1/16; G01M 99/00; G01M 1/34; G01M 7/08; G01M 17/028; G01M 17/045; G01M 3/3218; G01M 3/40; G01M 1/04; G01M 17/08; G01M 17/03; G01M 5/0091; G01M 1/365; G01M 13/04; G01M 5/0066;
(Continued)

(56) References Cited

U.S. PATENT DOCUMENTS 10,421,322 B1 * 9/2019 Samocki ............. B60C 23/0422
12,319,099 B2 * 6/2025 Iustin .................. B60C 23/0462
(Continued)

FOREIGN PATENT DOCUMENTS

CN 203888546 U * 10/2014
CN 105501006 A * 4/2016 ............... G06K 7/00
(Continued)

OTHER PUBLICATIONS

Extended European Search Report in corresponding European Application No. 22182827.0 dated Dec. 1, 2022 (7 pages).

*Primary Examiner* — Andre J Allen
(74) *Attorney, Agent, or Firm* — Venable LLP; Jeffri A. Kaminski

(57) ABSTRACT

A tire sensor pairing system for tire sensors mounted in a tire or on a rim of a wheel for a vehicle is provided. The tire sensor pairing system comprising an Radio Frequency, RF, shielding construction arranged to envelope the wheel and one or more RF signal receivers, thereby shielding the one or more RF signal receivers from RF signals originating from outside of the RF shielding construction and enabling the one or more RF signal receivers to solely receive RF signals from tire sensors mounted in the tire or on the rim of the wheel.

8 Claims, 3 Drawing Sheets

(58) Field of Classification Search
CPC ........ G01M 1/08; G01M 1/22; G01M 13/027; G01M 17/00; G01M 5/0033; G01M 1/00; G01M 15/044; G01M 3/24; G01M 3/2876; G01M 5/0075; G01M 1/06; G01M 1/12; G01M 1/122; G01M 1/24; G01M 1/32; G01M 1/36; G01M 11/081; G01M 13/023; G01M 13/025; G01M 17/0076; G01M 3/022; G01M 3/042; G01M 3/045; G01M 3/147; G01M 3/227; G01M 3/3236; G01M 5/0016; G01M 5/0025; G01M 5/0083; G01M 7/022; G01M 7/025; G01M 7/04; G01M 7/06; G01M 9/02; G01M 9/04; G01M 99/002; G01M 99/004; G01M 1/14; G01M 1/28; G01M 3/002; G01M 3/04; G01M 7/02; G01M 9/06; B60C 23/0408; B60C 23/0496; B60C 23/061; B60C 23/0494; B60C 23/0416; B60C 23/0433; B60C 23/0493; B60C 19/00; B60C 23/04; B60C 23/0462; B60C 23/041; B60C 23/20; B60C 23/0411; B60C 23/0479; B60C 23/0444; B60C 11/246; B60C 23/064; B60C 23/0488; B60C 11/24; B60C 23/007; B60C 23/062; B60C 23/0401; B60C 23/0413; B60C 23/06; B60C 23/043; B60C 23/02; B60C 23/0452; B60C 23/0498; B60C 23/0467; B60C 99/006; B60C 2019/004; B60C 23/0428; B60C 23/0442; B60C 11/243; B60C 23/009; B60C 23/0425; B60C 23/00354; B60C 23/004; B60C 23/045; B60C 23/0464; B60C 23/04985; B60C 23/00318; B60C 23/00; B60C 23/003; B60C 23/00372; B60C 23/0403; B60C 23/0406; B60C 23/0472; B60C 23/066; B60C 29/02; B60C 23/006; B60C 11/00; B60C 23/0454; B60C 23/044; B60C 23/0455; B60C 25/002; B60C 23/008; B60C 23/0483; B60C 23/0461; B60C 23/0474; B60C 23/0489; B60C 23/0491; B60C 29/064; B60C 23/0415; B60C 23/00363; B60C 23/0471; B60C 23/0459; B60C 23/0481; B60C 23/0476; B60C 11/0318; B60C 23/0477; B60C 2200/02; B60C 23/002; B60C 23/0437; B60C 2019/005; B60C 23/042; B60C 23/0405; B60C 23/0422; B60C 23/0423; B60C 23/0466; B60C 13/001; B60C 29/06; B60C 25/132; B60C 23/0427; B60C 23/0447; B60C 23/0449; B60C 9/18; B60C 25/00; B60C 23/065; B60C 23/0484; B60C 23/0486; B60C 19/003; B60C 23/00336; B60C 13/00; B60C 23/00345; B60C 23/08; B60C 17/00; B60C 2019/006; B60C 23/001; B60C 25/142; B60C 5/004; B60C 17/02; B60C 23/0445; B60C 23/0457; B60C 29/00; B60C 11/0083; B60C 25/145; B60C 9/02; B60C 11/0332; B60C 25/18; B60C 29/066; B60C 11/13; B60C 23/0418; B60C 23/0469; B60C 23/068; B60C 23/12; B60C 99/00; B60C 23/0432; B60C 25/138; B60C 5/14; B60C 11/03; B60C 23/005; B60C 25/005; B60C 25/007; B60C 25/0554; B60C 3/00; B60C 11/11; B60C 17/04; B60C 17/06; B60C 23/0435; B60C 23/063; B60C 23/10; B60C 25/14; B60C 29/005; B60C 29/062; B60C 99/003; B60C 11/032; B60C 11/12; B60C 13/003; B60C 15/06; B60C 19/001; B60C 23/126; B60C 23/127; B60C 23/16; B60C 29/068; B60C 3/04; B60C 9/20; B60C 11/01; B60C 11/0302; B60C 13/02; B60C 25/056; B60C 29/04; B60C 5/142; B60C 1/0016; B60C 11/0304; B60C 11/0306; B60C 19/08; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/131; B60C 23/135; B60C 23/137; B60C 23/18; B60C 25/02; B60C 11/02; B60C 17/0009; B60C 19/002; B60C 19/12; B60C 2019/007; B60C 2200/04; B60C 2200/06; B60C 23/00347; B60C 25/05; B60C 5/001; B60C 5/22; B60C 1/0008; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/12; B60C 9/005; B60C 9/1807; B60C 9/28; B60C 11/0041; B60C 11/04; B60C 2009/0276; B60C 2011/0033; B60C 2011/0346; B60C 2015/0617; B60C 2015/0678; B60C 2015/0682; B60C 2200/00; B60C 23/085; B60C 25/0548; B60C 25/185; B60C 7/105; B60C 7/107; B60C 9/22

USPC .................................................. 73/146–146.8

See application file for complete search history.

(56) References Cited

U.S. PATENT DOCUMENTS

2005/0109092 A1 * 5/2005 Martinez Marrufo ....................... B60C 23/061
73/146

2021/0279995 A1 9/2021 Muca et al.

FOREIGN PATENT DOCUMENTS

| CN | 207335964 U | | 5/2018 | |
|---|---|---|---|---|
| CN | 207570722 U | | 7/2018 | |
| CN | 112606635 A | * | 4/2021 | ......... B60C 23/0416 |
| CN | 107042810 B | * | 9/2021 | ............... H04K 3/90 |
| DE | 19852293 A1 | | 5/2000 | |
| DE | 102023122085 A1 | * | 2/2024 | ......... B60C 23/0437 |
| EP | 1681660 A1 | | 7/2006 | |
| FR | 3055618 A1 | | 3/2018 | |
| JP | 2006282091 A | | 10/2006 | |
| KR | 101067462 B1 | * | 9/2011 | ......... B60C 23/0416 |

(56) References Cited

FOREIGN PATENT DOCUMENTS

\* cited by examiner

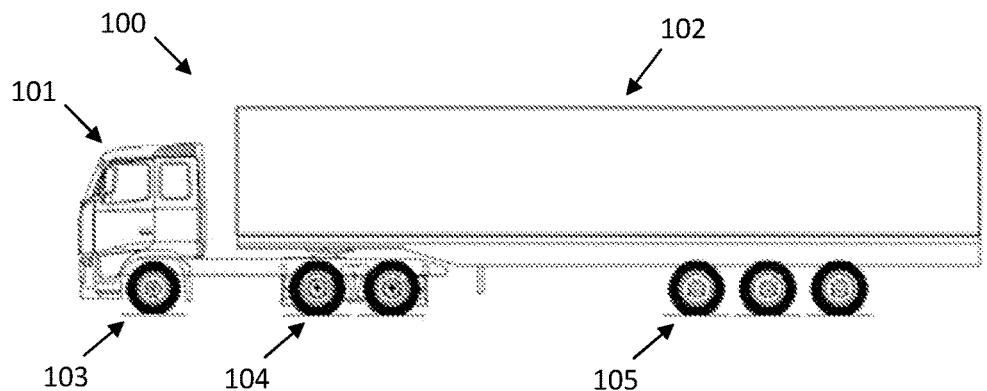
FIG. 1
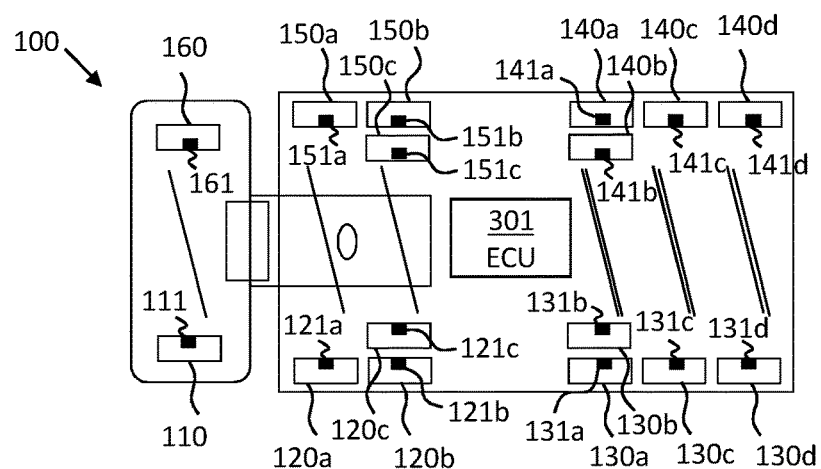
FIG. 2
FIG. 3

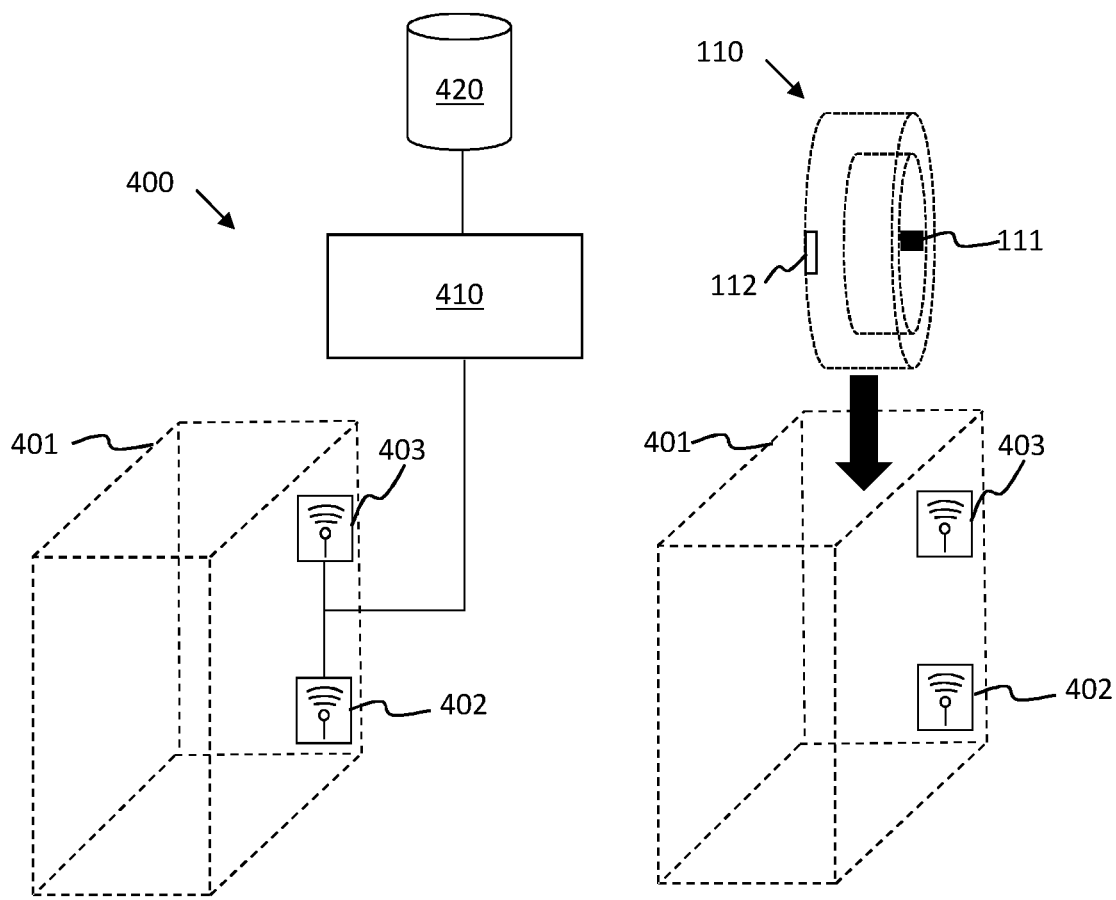
FIG. 4A
FIG. 4B
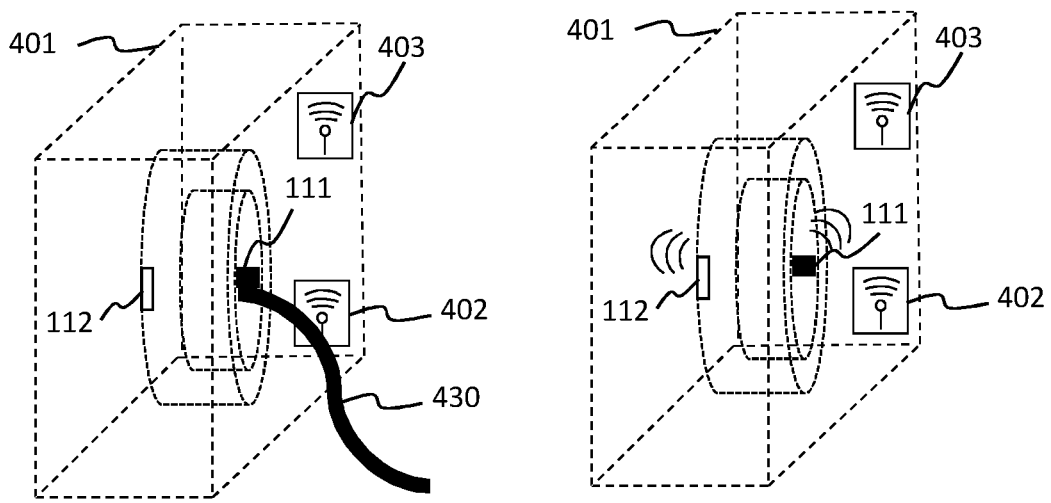
FIG. 4C
FIG. 4D

TIRE SENSOR PAIRING SYSTEM AND METHOD FOR PAIRING TIRE SENSORS

TECHNICAL FIELD

Embodiments herein relate in general to a sensor discrimination. In particular, embodiments herein relate to a tire sensor pairing system for tire sensors mounted in a tire or on a rim of a wheel for a vehicle. The embodiments herein also related to a method for pairing tire sensors mounted in a tire or on a rim of a wheel for a vehicle using the tire sensor pairing system.

BACKGROUND

In vehicles today, in particular heavy-duty vehicles such as semi-trailer vehicles or trucks for cargo transport, one or more central electronic control units, ECUs, may be implemented on-board the vehicle in order to read and collect sensor readings from various different types of wireless wheel sensors on-board the vehicle. In some cases, tire sensors may be located in or on the tires or rims on the wheels of the vehicle. The sensor data transmitted from these tire sensors may comprise, for example, tire pressure, tire temperature, tire deformation, the identity of the sensor, etc. These types of systems are conventionally referred to as Tire Pressure Monitoring Systems, TPMS, or Tire Health Systems, THS. TPMS/THS systems also normally employ Radio Frequency, RF, transmissions operating on specifically dedicated frequencies for transmitting its sensor data the on-board ECU or external sensor data receivers. In additional to such TPMS/THS systems, each tire and/or rim of a wheel may also have one or more integrated or mounted Radio Frequency Identification, RFID, sensors, i.e. RFID tags, for enabling identification of the specific tire and/or specific rim of a wheel. RFID also employs RF signals or transmissions. However, there is a need to improve how wheels are fitted with a tire and properly associated to its tire sensors, particularly in a noisy environment comprising multiple transmitting tire sensors.

SUMMARY

It is an object of embodiments herein to provide a tire pairing system for tire sensors mounted in a tire or on a rim of a wheel for a vehicle that seeks to mitigate, alleviate, or eliminate all or at least some of the above-discussed drawbacks of presently known solutions.

According to a first aspect of embodiments herein, the object is achieved by a tire sensor pairing system for tire sensors mounted in a tire or on a rim of a wheel for a vehicle. The tire sensor pairing system comprises an Radio Frequency, RF, shielding construction arranged to envelope the wheel and one or more RF signal receivers, thereby shielding the one or more RF signal receivers from RF signals originating from outside of the RF shielding construction and enabling the one or more RF signal receivers to solely receive RF signals from tire sensors mounted in the tire or on the rim of the wheel.

By having an RF shielding construction arranged with one or more RF signal receivers therein as describe above, an unambiguous sensor pairing of the mounted tire sensors on a tire/rim of a wheel, e.g. pressure, deformation and RFID sensors, is enabled. This is because sensor signals from other tire sensors outside of the RF shielding will not be able to penetrate the RF shielding, and thus not interfere with the reception of the tire sensor signals from the mounted tire sensors of the wheel performed by the RF signal receivers located within the RF shielding during pairing of the mounted tire sensors, e.g. during inflation of the tire. Hence, an improved tire sensor pairing system for tire sensors mounted in a tire or on a rim of a wheel for a vehicle is provided.

In some embodiments, the RF shielding construction may be formed by a conductive metal mesh, wherein the mesh size of the conductive metal mesh are adapted to RF frequencies used by the RF signals from the one or more tire sensors. This means that the RF shielding construction is specifically adapted to the RF frequencies of the RF signals transmitted from tire sensors, e.g. in a tire fitting centre or workshop. Here, according to some embodiments, the RF frequencies may comprise one or more of: 315, 433, 868, 915, 1900 and 2450 MHz, or within the UWB range 3.1-10.6 GHz. This means that the RF shielding construction may be specifically adapted to most preferred RF frequencies of RF signals transmitted from tire sensors, e.g. in a tire fitting centre or workshop. Also, in some embodiments, the one or more tire sensors comprise one or more of: an RFID sensor/tag, a tire pressure sensor, a tire temperature sensor, a tire deformation sensor or combinations thereof. This means that the RF shielding construction may be specifically adapted to the most common tire sensors.

According to some embodiments, the one or more RF signal receivers may be further arranged to be connected to a processing unit configured to pair the one or more tire sensors mounted in the tire or on the rim of the wheel in a database registry based on the RF signals received by the one or more RF signal receivers. This means, for example, that one or more tire pressure or deformation sensors in the tire or on the rim of a wheel may be associated with one or more RFID tags identifying the tire of the wheel in a database or database registry for digital storage. The database registry may be located locally or in remote server/data cloud solution accessible via a communications network, such as, e.g. the Internet.

Further, in some embodiments, the RF shielding construction may be arranged to allow the tire to be inflated on the rim of the wheel while enveloped by the RF shielding construction. This means that the RF shielding may additionally adapted to also act as a protective cage in case a tire explodes during inflation inside the RF shielding.

According to a second aspect of embodiments herein, the object is achieved by a method for pairing tire sensors mounted in a tire or on a rim of a wheel for a vehicle as described above. The method comprises receiving the wheel inside an RF shielding construction of a tire sensor pairing system. The method also comprises obtaining RF signals from tire sensors mounted in the tire or on the rim of the wheel via one or more one or more RF signal receivers of tire sensor pairing system enveloped by the RF shielding construction as the tire is inflated on the rim of the wheel. Furthermore, the method comprises pairing the tire sensors in a database registry based on the received RF signals.

In some embodiments, obtaining the RF signal may comprise triggering at least one of the tire sensors to transmit its RF signal in response to receiving the RF signal from another one of the tire sensors. In this case, obtaining the RF signals may also comprise receiving the RF signal from the triggered at least one of the tire sensors.

Effects and features of the second aspect is to a large extent analogous to those described above in connection with the first aspect.

BRIEF DESCRIPTION OF THE DRAWINGS

Features and advantages of the embodiments will become readily apparent to those skilled in the art by the following detailed description of exemplary embodiments thereof with reference to the accompanying drawings, wherein:

FIG. 1 is a side view of a vehicle,

FIG. 2 is a schematic illustration of a vehicle having tires with tire sensors,

FIG. 3 are schematic illustrations of a wheel comprising tire sensors,

FIG. 4A is a schematic illustration of a tire sensor pairing system according to some embodiments, FIGS. 4B-4D are schematic illustrations of how a tire sensor pairing system according to some embodiments may be used.

DETAILED DESCRIPTION

Figure 5:
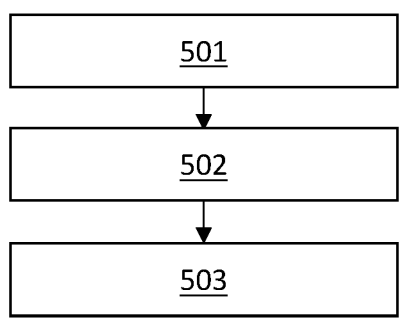
FIG. 5 is a flowchart illustrating embodiments of a method in a tire sensor pairing system.

Embodiments will now be described more fully hereinafter with reference to the accompanying figures. The figures are schematic and simplified for clarity, and they merely show details which are essential to the understanding of the embodiments presented herein, while other details have been left out. Throughout, the same reference numerals are used for identical or corresponding parts or steps. It is to be understood that the embodiments described herein should not be construed as limiting to the aspects set forth herein; rather, these embodiments are provided by way of example so that this disclosure will be thorough and complete, and will fully convey the scope of the appended claims to those skilled in the art.

FIG. 1 illustrates an example of a vehicle 100. In this case, the vehicle 100 is exemplified as a heavy-duty vehicle combination for cargo transport, i.e. a truck/towing vehicle 101 configured to tow a trailer unit 102 in a known manner, e.g. by a fifth wheel connection. The vehicle 100 comprises wheels 103, 104, and 105. It should be noted that with the term heavy-duty vehicle herein is meant a vehicle designed for the handling and transport of heavier objects or large quantities of cargo. The term heavy-duty vehicle may, however, also refer to a vehicle designed for use in construction, mining operations, or similar, such as, a working or construction machine. It should also be noted that even though the embodiments herein for enabling a determination of a location of a tire sensor on a chassis of a vehicle are described mainly with respect to a heavy-duty vehicle, such as, the heavy-duty vehicle combination 101, 120 in FIG. 1, the embodiments herein should not be considered restricted to this particular type of vehicle but may also be used in other types of vehicles, such as, passenger cars, commercial vehicles, busses, etc.

FIG. 2 illustrates a second top-side view of the vehicle 100 having wheels 110, 120, 130, 140, 150, 160 comprising tire sensors 111, 121, 131, 141, 151, 161. The vehicle 100 further comprise an electronic control unit, ECU 170. The ECU 170 and each of the one or more tire sensors 111, 121, 131, 141, 151, 161 on the vehicle 100 may be part of an on-board Tire Pressure Monitor System/Tire Health System, TPMS/THS. In other words, the one or more tire sensors 111, 121, 131, 141, 151, 161 on the vehicle 100 may be TPMS/THS sensors, and the ECU 170 may be a TPMS/THS sensor reader. The one or more tire sensors 111, 121, 131, 141, 151, 161 on the vehicle 100 may also be TPMS/THS transponders, tire pressure sensors, tire pressure and temperature sensors, or tire deformation sensors. The tire sensors 111, 121, 131, 141, 151, 161 may use Radio Frequency, RF, transmissions operating on specifically dedicated frequencies for transmitting its sensor data the on-board ECU or external sensor data receivers.

Furthermore, each tire and/or rim of each of the wheels 110, 120, 130, 140, 150, 160 may also have one or more integrated or mounted Radio Frequency Identification, RFID, sensor, i.e. RFID tag. The RFID tags (not shown in FIG. 2) enable identification of the specific tire and/or specific rim of each of the wheels 110, 120, 130, 140, 150, 160. The RFID tags may also use radio frequency transmissions.

FIG. 3 shows a cross-section (left) and side view (right) of a wheel 110. The wheel 110 comprise a tire 114 that has been fitted on a rim 113. The rim 113 may comprise an opening for an air valve 115 for use when inflating or pressurizing the tire 114 on the rim 113. In this case, the tire 114 of the wheel 110 comprises a RFID tag 112. The RFID tag 112 may be used to identify the tire 114. The wheel 110 may comprise a tire pressure sensor 111. A suitable location of the tire pressure sensor 111 may be on the rim 113 close to the air valve 115. It should be noted that although the example in FIG. 3 only shows two tire sensors, the wheel 110 may comprise further tire sensors, such as, e.g. a tire deformation sensor of the tire 114 or a further RFID tag identifying the rim 113.

As part of the developing of the embodiments described herein, it has been realized that, for example, during pairing of tire sensors and RFID tags for a wheel at a tire fitment station, once a tire is being inflated, the tire sensor inside of the tire will get activated and start a scheduled broadcasting. However, several different wheels all around the tire fitment station may send their tire sensor readings simultaneously, which all then may mistakenly be picked up and registered by a receiver. In order to obtain a correct pairing, a tire sensor pairing system needs to be able to discriminate between any surrounding sensor signals and the sensor signals from the tire sensors actually fitted in the wheel for which a tire is currently being fitted, i.e. it must only use the sensor signal from the sensor fitted inside the currently fitted wheel. As mentioned, this may be particularly difficult in a noisy environment comprising multiple transmitting tire sensors, such as, e.g. in a tire fitment centre, station or workshop. This problem is addressed by the embodiments described herein.

FIG. 4A shows a schematic illustration of a tire sensor pairing system 400 according to some embodiments. The tire sensor pairing system 400 may comprise a Radio Frequency, RF, shielding construction 401, one or more RF signal receiver 402, 403, a processing unit 410 and a database 420.

Figure 7:
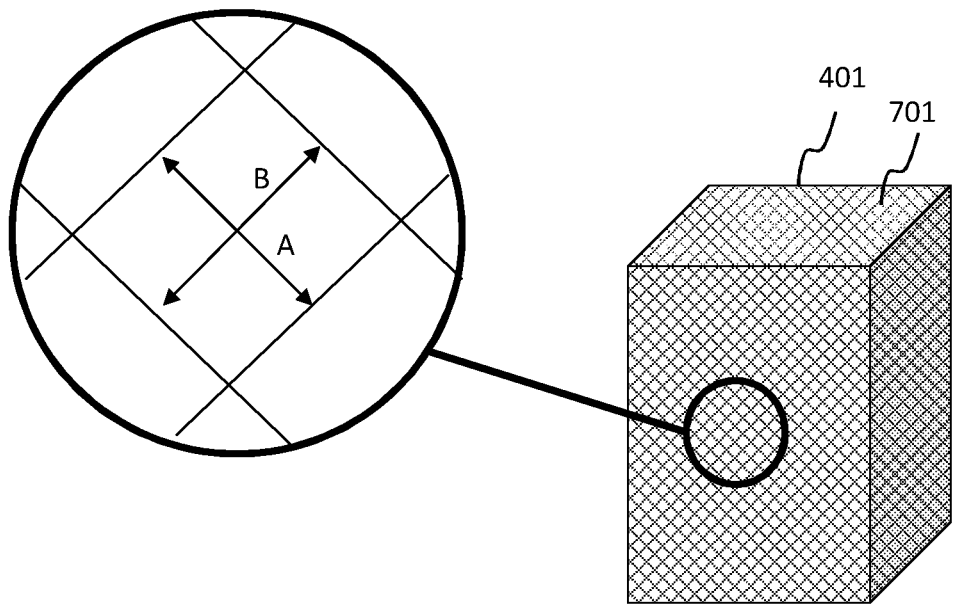
FIG. 7 is a schematic illustration of RF shielding construction of a tire sensor pairing system according to some embodiments.

The RF shielding construction 401 may be a metal frame enclosure or cage. For example, a conductive metal mesh 701 may surround a metal frame to form the RF shielding construction 401 as shown in FIG. 7. Thus, RF shielding construction 401 may provide RF signal shielding by acting like a Faraday cage. This means that RF signals transmitted outside of the RF shielding construction 401 will not be able to enter the RF shielding construction 401, while RF signals transmitted within the RF shielding construction 401 will not be able to escape outside of the RF shielding construction 401. The RF shielding construction 401 may be adapted for certain frequencies of RF signals by the mesh size A, B of the conductive metal mesh 701 having certain lengths.

Since tire sensors, such as, e.g. the tire pressure sensor 111 and the RFID tag 112 in the wheel 110, normally operates on RF frequencies comprise one or more of 315, 433, 868, 915, 1900 and 2450 MHz (or within the UWB range 3.1-10.6 GHz), the mesh size A, B of the conductive metal mesh 701 of the RF shielding construction 401 may be adapted based on which frequency or frequencies the tire sensors being paired is operating on, if needed. For example, the wavelength (lambda or $\lambda$) at 315 MHz is 0.95 m, and the wavelength at 2450 MHz is 0.12 m. In some embodiments, distances A and B in the conductive metal mesh 701 may be $\lambda/4$ of the highest frequency to be used inside the RF shielding construction 401, i.e. $\lambda/4=0.12/4=3$ cm in this case.

The size of the RF shielding construction 401 may also be adapted to fit and surround a wheel, such as, e.g. the wheel 110. The RF shielding construction 401 may also have an opening and closing mechanism, which allows a user to open the RF shielding construction 401, place a wheel inside the RF shielding construction 401 and close the RF shielding construction 401. The RF shielding construction 401 may also be adapted so as to allow for a tire of a wheel to be inflated on the rim of the wheel while the wheel is located within the RF shielding construction 401. For example, as shown in FIG. 4C, the RF shielding construction 401 may be provided with an air supply 430 arranged to connect to, and supply pressurized air via, the air valve 115 of the tire 114 of the wheel 110 while the wheel 110 is located within the RF shielding construction 401.

It should also be noted that the RF shielding construction 401 may also be adapted to be function as a tire inflation protection cage; that is, in case the tire 114 of the wheel 110 explodes inside the RF shielding construction 401 while being inflated, the RF shielding construction 401 will stop any substantial debris from being spread out of the RF shielding construction 401. This may be ensured by having the conductive metal mesh 701 of the RF shielding construction 401 made of a strong enough metal, such as, e.g. steel.

Located within the RF shielding construction 401 is one or more RF signal receivers 402, 403. The one or more RF signal receivers 402, 403 may be tire sensor receivers adapted to receive RF signal transmissions from tire sensors, such as, e.g. the tire pressure sensor 111 or RFID tag 112. For example, the one or more RF signal receivers 402, 403 may comprise a Tire Pressure Monitor System/Tire Health System, TPMS/THS, reader 402 and an RFID reader/scanner 403. In some cases, the TPMS/THS and RFID reader/scanner 402, 403 may integrated into a single RF signal receiver or, in some cases, share different components. Since being located on the inside of the conductive metal mesh 701 of the RF shielding construction 401, the one or more RF signal receivers 402, 403 will only be able to receive RF signal transmitted from within the RF shielding construction 401. Upon receiving RF signals from within the RF shielding construction 401, the one or more RF signal receivers 402, 403 may forward the signals to the processing unit 410, e.g. via wired or wireless connection. The processing unit 410 may be arranged to pair the two or more tire sensors from which the received RF signals originated. This may, for example, be performed by creating an association between the two or more tire sensors in a database registry 420. As shown in FIG. 4A, the database registry 420 may be configured in a remote database, a remote server or a cloud-storage solution, etc. However, the database registry 420 may also be configured locally in a memory within the processing unit 410. An example of the processing unit 410 is described in more detail below with reference to FIG. 6.

Here, it should also be noted that tire sensors, such as, e.g. the tire pressure sensor 111 or RFID tag 112, are normally scheduled to send frames of information in its tire sensor signals, such as, e.g. supplier identity, sensor identity, pressure info, temperature info, status information, etc. Depending on the mode of operation of the tire sensor, frames may be sent in different ways. Also, since the tires sensors conventionally are battery-powered sensors, the tire sensors are normally configured in an off-mode prior to fitment inside a wheel. This in order to save battery lifetime. Hence, the tire sensors needs to be activated in order to transmit its tire sensor signals. This is described in more detail below with reference to FIGS. 4B-4D.

Further to illustrating the tire sensor pairing system 400, FIGS. 4B-4D illustrates how the tire sensor pairing system 400 may be used by a user/operator of the tire sensor pairing system 400 according to the method described by the embodiments presented below with reference to FIG. 5.

As shown in FIG. 4B, the wheel 110 comprising the tire pressure sensor 111 and the RFID tag 112 may initially be inserted into the RF shielding construction 401. The tire pressure sensor 111 of the wheel 110 may then be activated by a delta pressure occurring in the tire 114, i.e. a pressure difference. For example, the tire 114 may be inflated on the rim 113 of the wheel 110 by the air supply 430 as shown in FIG. 4C. In this case, the tire 114 will conventionally be provided with a recommended air pressure which is usually about 8-10 bars. As the tire pressure sensor 111 usually have a programmed threshold pressure level after which it gets activated, e.g. from 2 bars and above, the tire pressure sensor 111 will sense the change in air pressure, become activate, and thus transmit its RF signal to the one or more RF signal receivers, e.g. the TPMS/THS reader/scanner 402, within the RF shielding construction 401 as shown in FIG. 4D.

Prior to, simultaneously as, or in response to, an inflation of the tire 114, the one or more RF signal receivers, e.g. the RFID reader/scanner 403, may be configured to scan for RFID the RF shielding construction 401, such as, the RFID tag 112 in the tire 114 of the wheel 110. The RFID scanner 402, 403 may transmit an RFID signal towards the RFID tag 112. The RFID signal may, for example, be an RFID interrogation signal and/or a generated electromagnetic field configured to trigger a RFID response from the RFID tag 112. Hence, as the RFID tag 112 receives the RFID signal from the RFID reader/scanner 403, the RFID tag 112 will respond with a RFID response signal comprising the identity of the RFID tag 112. In other words, the RFID reader/scanner 403 may receive a RFID response signal from the RFID tag 112 in response to the RFID tag 112 receiving its transmitted RFID signal.

Examples of embodiments of a method for pairing tire sensors 111, 112 mounted in a tire 114 or on a rim 113 of a wheel 110 for a vehicle 100, will now be described with reference to the flowchart depicted in FIG. 5. FIG. 5 is an illustrated example of actions or operations which may be taken by the tire sensor pairing system 400 or a user thereof. The method may comprise the following actions.

Action 501. Initially, the tire sensor pairing system 400 receives the wheel 110 inside an RF shielding construction 401 of a tire sensor pairing system 400. For example, a user of the tire sensor pairing system 400 may place the wheel 110 inside the RF shielding construction 401. This is exemplified in FIG. 4B.

Action 502. After placing the wheel 110 inside the RF shielding construction 401, the tire sensor pairing system 400 obtains RF signals from tire sensors 111, 112 mounted in the tire 114 or on the rim 113 of the wheel 110 via one or more one or more RF signal receivers 402, 403 of tire sensor pairing system 400 enveloped by the RF shielding construction 401 as the tire 114 is inflated on the rim 113 of the wheel 110. This is exemplified in FIG. 4C, wherein a user of the tire sensor pairing system 400 may inflate the tire 114 on the rim 113 of the wheel 110 while the wheel 110 is located inside the RF shielding construction 401.

According to some embodiments, the tire sensor pairing system 400 may trigger at least one of the tire sensors 112 to transmit its RF signal in response to receiving the RF signal from another one of the tire sensors 111. In this case, the tire sensor pairing system 400 may also receive the RF signal from the triggered at least one of the tire sensors 112. For example, the reception of RF signal by the TPMS/THS reader 402 from the tire pressure sensor 111 may be used to trigger the RFID reader/scanner 403 to scan for the RFID tag 112 and/or further RFID tags, such as e.g. a RFID tag of the rim 113. According to a further example, the tire sensor pairing system 400 may also receive RF signals from the tire pressure sensor 111, as well as, form other tire sensors (not shown) located in the tire 114 or rim 113 of the wheel 110, such as, a tire temperature sensor or a tire deformation sensor (not shown).

Action 503. After receiving the RF signals from the tire sensors 111, 112, the tire sensor pairing system 400 pairs the tire sensors 111, 112 in a database registry 420 based on the received RF signals.

Figure 6:
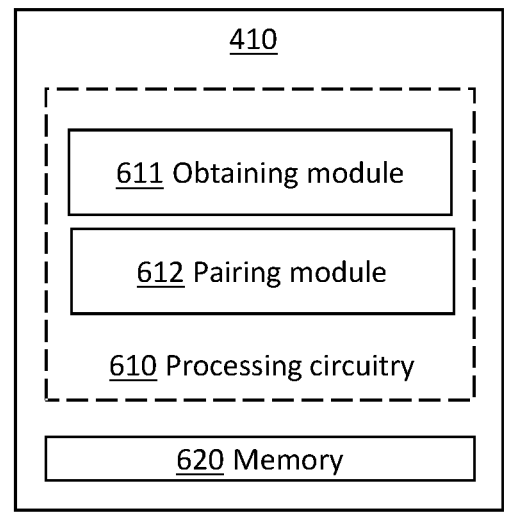
FIG. 6 is a schematic illustration of a processing unit of a tire sensor pairing system according to some embodiments.

FIG. 6 shows an example of a processing unit 410 of the tire sensor pairing system 400. The processing unit 410 may, for example, implemented in a general purpose computer. Although not shown in FIG. 6, known conventional features of the processing unit 410, such as, a power source (e.g. a battery or connection to the mains), may be assumed to be comprised in the processing unit 410.

The processing unit 410 may comprise a processing circuitry 610 and a memory 620. It should also be noted that some or all of the functionality described in the embodiments herein as being performed by the processing unit 410 may be provided by the processing circuitry 610 executing instructions stored on a computer-readable medium, such as, the memory 620 shown in FIG. 6. Besides being arranged to communicate with the one or more RF signal receivers 402, 403, the processing circuitry 410 may further be arranged to communicate with the database registry 420. Furthermore, the processing circuitry 610 may further comprise additional components, such as, for example, an obtaining module 611 and a pairing module 612, each responsible for providing its functionality to support the embodiments described herein.

First, the tire sensor pairing system 400 may receive the wheel 110 inside an RF shielding construction 401 of a tire sensor pairing system 400. Then, the processing unit 410 or processing circuitry 610 is configured to, or may comprise the obtaining module 611 configured to, obtain RF signals from tire sensors 111, 112 mounted in the tire 114 or on the rim 113 of the wheel 110 via one or more one or more RF signal receivers 402, 403 of tire sensor pairing system 400 enveloped by the RF shielding construction 401 as the tire 114 is inflated on the rim 113 of the wheel 110. The processing unit 410 or processing circuitry 610 is further configured to, or may comprise the pairing module 612 configured to, pair the tire sensors 111, 112 in a database registry 420 based on the received RF signals.

In some embodiments, the processing unit 410 or processing circuitry 610 may be configured to, or may comprise the obtaining module 611 configured to, trigger at least one of the tire sensors 112 to transmit its RF signal in response to receiving the RF signal from another one of the tire sensors 111. In this case, the processing unit 410 or processing circuitry 610 may be configured to, or may comprise the obtaining module 611 configured to, receive the RF signal from the triggered at least one of the tire sensors 112.

Furthermore, the embodiments for pairing tire sensors 111, 112 mounted in a tire 114 or on a rim 113 of a wheel 110 for a vehicle 100 described above may be at least partly implemented through one or more processors, such as, the processing circuitry 610 in the processing unit 410 in the tire sensor pairing system 400 depicted in FIG. 6, together with computer program code for performing at least parts of the functions and actions of the embodiments herein. The program code mentioned above may also be provided as a computer program product, for instance in the form of a data carrier carrying computer program code or code means for performing the embodiments herein when being loaded into the processing circuitry 610 in the processing unit 410. The data carrier, or computer readable medium, may be one of an electronic signal, optical signal, radio signal or computer-readable storage medium. The computer program code may e.g. be provided as pure program code in the processing unit 410 or on a server and downloaded to the processing unit 410. Thus, it should be noted that the operations of the processing unit 410 may in some embodiments be implemented as computer programs stored in the memory 620 in FIG. 6, e.g. the computer readable storage unit/module, for execution by processors or processing modules, e.g. the processing circuitry 610 in FIG. 6.

Those skilled in the art will also appreciate that the processing circuitry 610 and the memory 620 described above may refer to a combination of analog and digital circuits, and/or one or more processors configured with software and/or firmware, e.g. stored in a computer readable storage unit/module, that when executed by the one or more processors such as the processing circuitry 610 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatuses, modules, systems and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

It should also be noted that the various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes. The embodiments herein are not limited to the above described preferred embodiments. Various alternatives, modifications and equivalents may be used. Therefore, the above embodiments should not be construed as limiting.

The invention claimed is:

1. A tire sensor pairing system for tire sensors mounted in a tire or on a rim of a wheel for a vehicle, the tire sensor pairing system comprising
an Radio Frequency, RF, shielding construction arranged to envelope the wheel and one or more RF signal receivers, thereby shielding the one or more RF signal receivers from RF signals originating from outside of the RF shielding construction and enabling the one or more RF signal receivers to solely receive RF signals from tire sensors mounted in the tire or on the rim of the wheel.

2. The tire sensor pairing system according to claim 1, wherein the RF shielding construction is formed by a conductive metal mesh, wherein the mesh size of the conductive metal mesh are adapted to RF frequencies used by the RF signals from the one or more tire sensors.

3. The tire sensor pairing system according to claim 1, wherein the RF frequencies comprise one or more of: 315, 433, 868, 915, 1900 and 2450 MHz, or within the Ultra-Wideband, UWB, range of 3.1-10.6 GHz.

4. The tire sensor pairing system according to claim 1, wherein the one or more tire sensors comprise one or more of: an RFID sensor/tag, a tire pressure sensor, a tire temperature sensor, a tire deformation sensor or combinations thereof.

5. The tire sensor pairing system according to claim 1, wherein the one or more RF signal receivers are further arranged to be connected to a processing unit configured to pair the one or more tire sensors mounted in the tire or on the rim of the wheel in a database registry based on the RF signals received by the one or more RF signal receivers.

6. The tire sensor pairing system according to claim 1, wherein the RF shielding construction is arranged to allow the tire to be inflated on the rim of the wheel while enveloped by the RF shielding construction.

7. A method for pairing tire sensors mounted in a tire or on a rim of a wheel for a vehicle, the method comprising:
receiving the wheel inside an RF shielding construction of a tire sensor pairing system;
obtaining RF signals from tire sensors mounted in the tire or on the rim of the wheel via one or more one or more RF signal receivers of tire sensor pairing system enveloped by the RF shielding construction as the tire is inflated on the rim of the wheel; and
pairing the tire sensors in a database registry based on the received RF signals.

8. The method according to claim 7, wherein the obtaining comprises triggering at least one of the tire sensors to transmit its RF signal in response to receiving the RF signal from another one of the tire sensors, and receiving the RF signal from the triggered at least one of the tire sensors.

* * * * *